United States Patent [19]

Suzuki

[11] 4,396,270

[45] Aug. 2, 1983

[54] CAMERA HAVING A PHOTOGRAPHING LENS PROTECTION MEMBER

[75] Inventor: Toyotosi Suzuki, Tokyo, Japan

[73] Assignee: Canon Kabushiki Kaisha, Japan

[21] Appl. No.: 345,644

[22] Filed: Feb. 4, 1982

[30] Foreign Application Priority Data

Feb. 13, 1981 [JP] Japan .............................. 56-18794[U]

[51] Int. Cl.³ .............................................. G03B 17/38
[52] U.S. Cl. .................................................. 354/268
[58] Field of Search .............. 354/253, 266, 268, 287, 354/288

[56] References Cited

U.S. PATENT DOCUMENTS

| | | | |
|---|---|---|---|
| 3,427,943 | 2/1969 | Leibundgut | 354/268 |
| 3,810,227 | 5/1974 | Tanaka | 354/266 X |
| 4,019,192 | 4/1977 | Miyagawa | 354/266 X |
| 4,272,168 | 6/1981 | Maitani et al. | 354/268 X |

*Primary Examiner*—John Gonzales
*Attorney, Agent, or Firm*—Toren, McGeady and Stanger

[57] ABSTRACT

A camera is provided with a protection member in front of the lens for opening or closing the photographing lens in order to protect the lens in such a manner that the shutter release is locked in case the protection member is not opened or the film has not been wound.

8 Claims, 2 Drawing Figures

CAMERA HAVING A PHOTOGRAPHING LENS PROTECTION MEMBER

BACKGROUND OF THE INVENTION

1. Field of the Invention

The present invention relates to a camera whose shutter release is locked when the film has not yet been wound up or the photographing lens protection member is closed.

2. Description of the Prior Arts

In the prior art, it is known to provide cameras with a lens protection member which opens and closes in order to protect the photographing lens from dust, finger mark and the like. Until recently, many cameras of this type have been provided with a shutter release lock mechanism operatively engaging the lens protection member with the shutter release mechanism operating in such a manner that the shutter cannot be released when the protection member is closed. For example, in the case of a camera sold under the trade name of CANON 110ED, the exclusive shutter release lock lever-operatively engaged with the lens protection member locks while the lens protection member is closed, while in case of the camera sold under the trade name of OLYMPUS XA, the main switch is operatively engaged with the lens protection member so as to lock the shutter release. However, these types of cameras have to be provided with exclusive levers, switches and so on in order to lock the shutter release with the result that the construction becomes complicated and the manufacturing cost higher, which is disadvantageous.

SUMMARY OF THE INVENTION

An object of the present invention is to eliminate the above-mentioned shortcomings and to prevent by means of a very simple construction, erroneous photography while the film has not yet been wound up or the lens protection member is still closed by providing that the lock mechanism working when the film has not yet been wound up is used in common in order to lock the shutter release when the lens protection member is closed.

Another object of the present invention is to prevent the erroneous photography when the lens protection member is half opened by providing that the lens protection member cannot stop at the position at which the member is half opened.

DETAILED DESCRIPTION OF PREFERRED EMBODIMENT

Below the present invention will be explained in detail in accordance with the drawings of an embodiment hereof.

Figure 1:
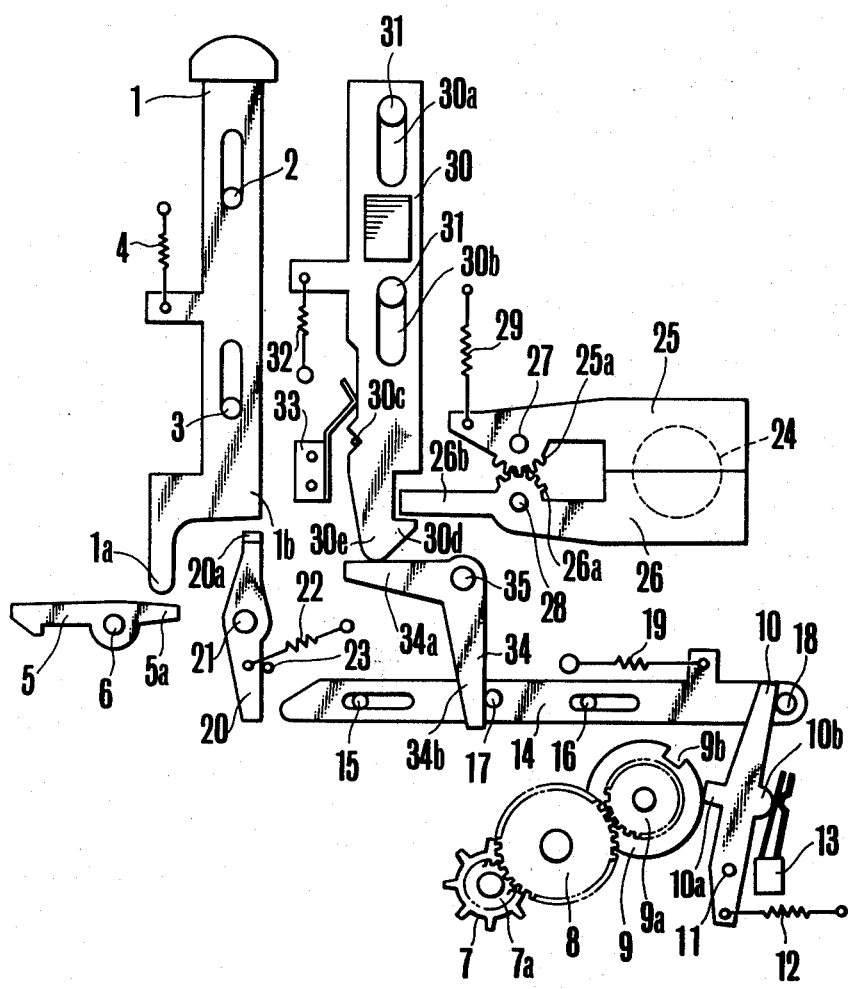
FIG. 1 shows an embodiment of the present invention in plane view, whereby the lens protection member is in the closed state while the film is being wound up.

FIG. 1 shows the state the lens protection member is closed while the film is being wound in plane view.

Figure 2:
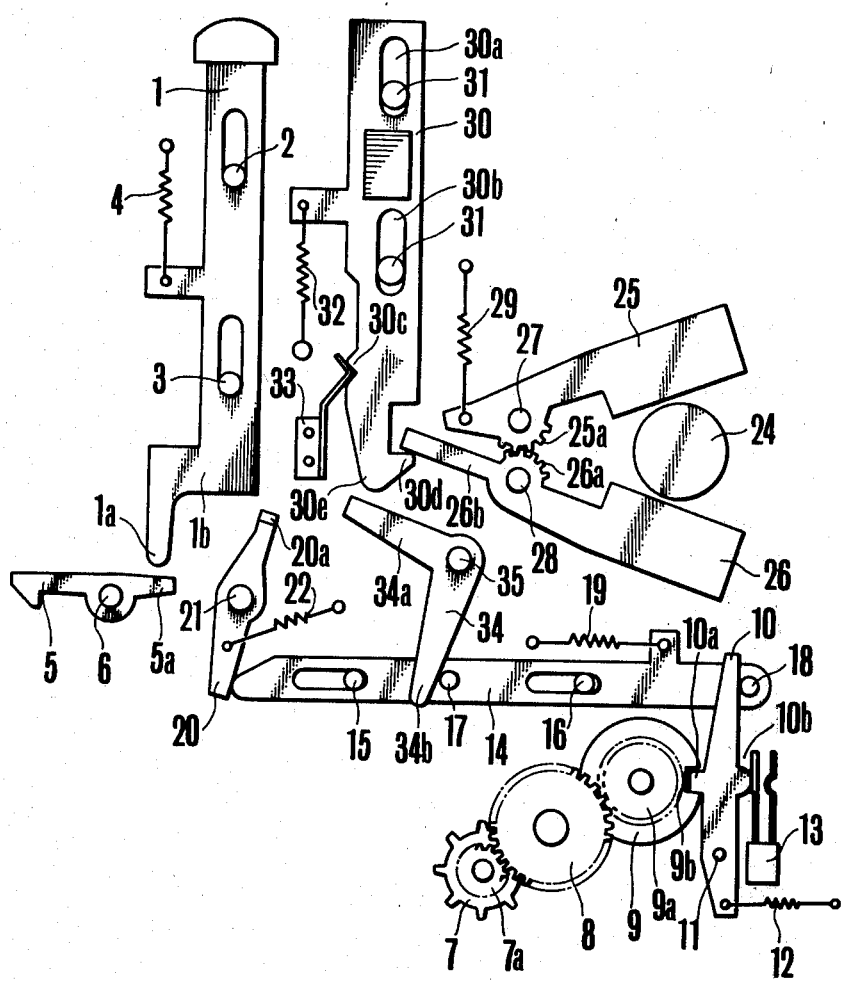
FIG. 2 shows the same embodiment as shown in FIG. 1 also in plane view, whereby the film has been wound up and the lens protection member is opened.

FIG. 2 shows the state the lens protection member is opened after the lens protection member has been opened in plane view.

In the drawing, a release lever 1 is guided so as to be slidable upwards and downwards by means of shafts 2 and 3, the lever 1 having a stepped portion 1b and a projection 1a and being urged upwards by means of a spring 4. A shutter holding lever 5 having an arm engageable with the projection 1a is rotatably mounted on a shaft 6. 7 is a film driving sprocket having a gear 7a. 8 is an idler gear and 9 is an index plate having a gear 9a and a notch 9b, being respectively engaged with the gears 7a, 8 and 9a. 10 is a brake lever rotatably mounted on a shaft 11, and having a projection 10a engageable into the notch 9b and another projection 10b at the diametrical position and urged along the counterclockwise direction by means of a spring 12. 13 is a winding switch, which is closed by means of the projection 10b in the state shown in FIG. 1 so that a motor (not shown) is driven so as to wind up the film and charge the shutter. 14 is a lock release lever guided by means of shafts 15 and 16 so as to be slidable, having the pins 17 and 18 and being urged toward the left by means of the spring 19. 20 is a lock lever carried by a shaft 21 so as to be rotatable, having a rising portion 20a and being urged by means of a spring 22 along the counterclockwise direction so as to be in contact with the stopper 23. Described above is a conventional release lever lock mechanism whereby, when the film is wound up, depression of the release lever 1 is prohibited by the lock lever 20 with the rising portion 20a as is shown in FIG. 1, while when the motor is driven the sprocket 7 operatively engaged therewith is rotated at a constant speed in such a manner that when the notch 9b of the index plate 9 coincides with the projection 10a, the projection 10a is engaged into the notch 9b so as to stop. When the lever 10 is rotated along the counterclockwise direction so as to open the switch 13 the motor stops, and the lock release lever 14, which is urged by means of the spring 19, moves toward the left in the drawing so as to rotate the lock lever 20 along the clockwise direction to release the release lever 1 in such a manner that the release button can be again depressed.

In accordance with the present invention, when the camera having the release lever lock mechanism is provided with the lens protection member the lock lever 20 can assume the lock position even when the lens protection member is closed.

In the system of the invention, a photographing lens 24 is equipped with lens protection members 25 and 26 which are rotatably mounted on shafts 27 and 28, whereby a gear 25a engaged with a gear 26a operates to maintain the lens protection members normally closed by means of a spring 29. A lens protection member actuating lever 30 slidable on shafts 31 engaged in elongate holes 30a and 30b, is urged downward by means of a spring 32 so The lever 30 also includes a click groove 30c engaged by a click spring 33 and projections 30d and 30e. A bell crank lever 34 rotatably mounted on shaft 35 and having the arms 34a and 34b is engageable with the projection 30e and the pin 17.

In the operation of the mechanism described above, sprocket 7 operatively engaged with the film winding motor (not shown) rotates at a constant speed until the notch 9b of the index plate 9 coincides with the projection 10a, and the projection 10a is engaged in the notch 9b so as to stop. With rotation of the lever 10 along the counterclockwise direction the switch 13 is opened so as to stop the motor. Because at this time, the urging force of the spring 32 and the lengths of the arms 34a and 34b of the bell crank lever 34 are determined in such a manner that the lens protection member actuating lever 30 is not moved upwards with the urging strength of the spring 19, the lock release lever 14 is prevented with the bell crank lever 34 from moving leftward. Consequently, the lock lever 20 is not rotated, while release lever 1 remains locked by means of the rising portion 20a.

When now the lens protection member actuating lever 30 slides upwards against the strength of the spring 32, the click 33 is engaged in the click groove 30c so as to open the lens protection members 25 and 26 as is shown in FIG. 2. In case at this time, the lens protection member actuating lever 30 is not moved up to the determined position so as to completely open the lens protection members 25 and 26, the click 33 is not engaged into the click groove 30c so that the lens protection members 25 and 26 are brought back into the closed state by means of the spring 32.

When the lens protection member actuating lever 30 is moved upwards up to the determined position, the bell crank lever 34 becomes rotatable along the clockwise direction in such a manner that the lock release lever 14 is moved leftwards, thereby the lower end of the lock lever 20 is depressed with the end of the lever 14. Consequently, the lock lever 20 is rotated along the clockwise direction so as to withdraw the rising portion 20a from the stepped portion 1b of the release lever 1. Thus, the release lever 1 can be depressed. When the release lever 1 is depressed the shutter holding lever 5 is rotated along the clockwise direction by means of the end 1a so as to start the shutter (not shown). When the shutter has finished its operation, the brake lever 10 is rotated along the clockwise direction by means of a part of the shutter blade as is shown in FIG. 1 so that the winding up switch 13 is closed again so as to start the winding motion.

As described hereinabove, the shutter release can be locked by utilizing a mechanism which locks the shutter release until completion of the film wind-up even when the lens protection member is not in an open state, so that there can be prevented by a very simple structure erroneous photography while the lens protection member is in a closed state.

Further, by providing that the shutter release remains locked until the photographing lens protection member has been completely opened in accordance with the present invention, film exposure can be avoided when the photographing lens protection member is half opened or when the photographing lens is insufficiently protected.

While a specific embodiment of the invention has been shown and described in detail to illustrate the application of the inventive principles, it will be understood that the invention may be embodied otherwise without departing such principles.

What is claimed is:

1. A camera comprising:
   a photographing lens and a shutter release member;
   a photographing lens protection member provided in front of said lens so as to open or close the lens in order to protect said photographing lens;
   lock means for locking said shutter release member until film in said camera has been wound up; and
   lock release prevention means for preventing the lock release of said lock means when said lens protection member is not in the opened state.

2. A camera in accordance with claim 1, wherein said lock means comprise a lock member for preventing depression of said shutter release member and a lock release member for releasing the lock member.

3. A camera in accordance with claim 1, wherein said lock release prevention means comprise an actuating member for opening or closing the lens protection member and a lock release prevention member operatively engaged with the actuating member.

4. A camera in accordance with claim 1, wherein said lens protection member is operative to assume a totally opened or totally closed position, being unable to stop at an intermediate position therebetween.

5. A camera in accordance with claim 3, wherein said actuating member is not capable of stopping at any position other than one determined in such a manner that the lens protection member assumes the totally opened or the totally closed state.

6. A camera in accordance with claim 5, wherein said actuating member is rendered not capable of stopping at any position other than said determined position, by means of an urging member and a click mechanism.

7. A camera comprising:
   a photographing lens;
   a shutter release member;
   a lock member for preventing the depression of the shutter release member;
   a lock release member for releasing the lock member;
   a photographing lens protection member provided in front of the lens for opening and closing the lens in order to protect the lens;
   an actuating member for opening or closing the lens protection member; and
   a lock release prevention member operatively engaged with the actuating member.

8. A camera in accordance with claim 7, wherein the actuating member includes an urging member and a click mechanism operating so as to bring the lens protection member into the totally opened or the totally closed state.

* * * * *